No. 888,519. PATENTED MAY 26, 1908.
F. N. MARTINDALE.
KETTLE.
APPLICATION FILED JULY 1, 1907.
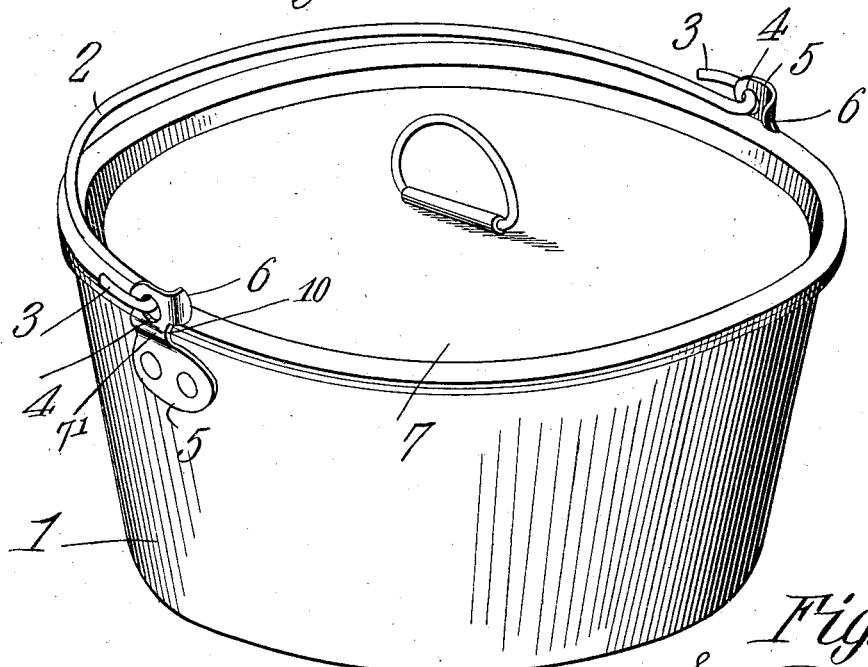
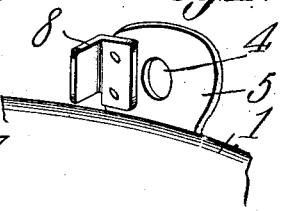
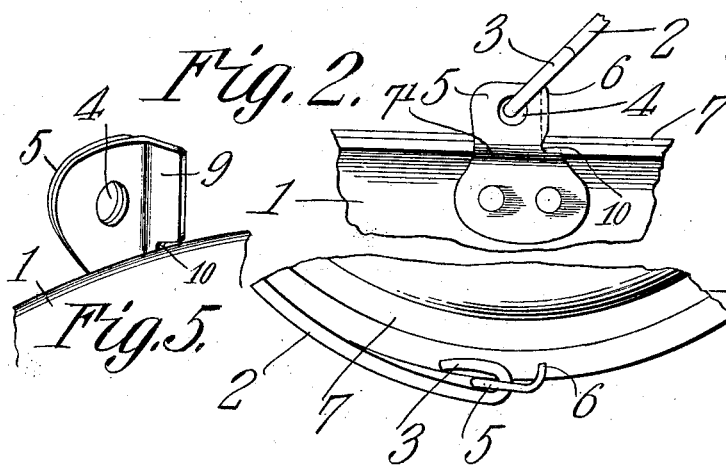
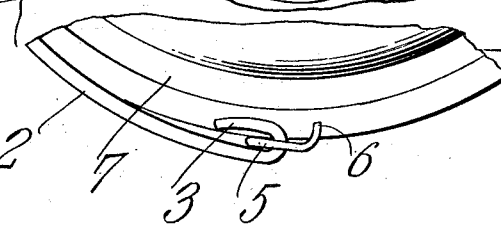
WITNESSES: Frederick N. Martindale,
INVENTOR.
By C. A. Snow & Co.
ATTORNEYS

UNITED STATES PATENT OFFICE.

FREDERICK NEWELL MARTINDALE, OF GOUVERNEUR, NEW YORK.

KETTLE.

No. 888,519.	Specification of Letters Patent.	Patented May 26, 1908.

Application filed July 1, 1907. Serial No. 381,750.

*To all whom it may concern:*

Be it known that I, FREDERICK N. MARTINDALE, a citizen of the United States, residing at Gouverneur, in the county of St. Lawrence and State of New York, have invented a new and useful Kettle, of which the following is a specification.

This invention relates particularly to that type of kitchen utensil generally provided with a swinging bail handle and which is used to boil or stew food of various kinds in.

One object of the invention is to provide a simple means for supporting the bail above the vessel away from the steam generated therein and the heat of the stove so that the bail may be always in a convenient position and cool enough to be grasped.

Another object of the invention is directed to the means for retaining the cover on the vessel so that the vessel may be turned on its side and the water drawn off therefrom without disturbing the cover in any way or spilling the contents of the vessel.

In the accompanying drawings: Figure 1 is a perspective view of a vessel provided with the improvement. Fig. 2 is a side elevation of a portion of a vessel showing a bail ear and a portion of the bail. Fig. 3 is a plan view of that portion of the vessel shown in Fig. 2 with the cover in place. Figs. 4 and 5 are views illustrating modifications.

Similar reference numerals are used for the same parts on all the figures.

The utensil 1 may be of any known construction carried by a bail 2 having hooked ends 3 engaging openings 4 in ears 5 riveted to opposite sides of the edge of the utensil and projecting a short distance above it. One vertical edge of each ear is bent inwardly at about a right angle to the rim of the utensil, to form a vertically disposed hold down and stop flange 6 for the cover 7 and a limiting stop for the handle or bail 2 which is held at an angle as shown in Fig. 2, and in a convenient position for grasping. It is also raised above the space between the kettle and cover through which steam escapes and there is thus no danger of it becoming heated either by steam or from the stove.

The spaces below the turned portions 6 of the ears are just sufficient to permit the cover being slipped under from the rear and pushed forward to entirely cover the kettle before being stopped. They thus hold the cover firmly in place both against sliding off or over-turning when the kettle is turned to empty its fluid contents.

Attention is here called to the fact that the metal forming each bail supporting ear is stamped or pressed laterally to produce a terminal transverse rib 7', which latter not only serves to reinforce and strengthen the ear but also serves to accommodate the rim of the vessel, as shown.

Instead of making the stops 6 integral with the ears 5 as represented in Figs. 1, 2 and 3 each stop may be formed of a separate piece of metal 8 soldered or riveted to the ear 5 between the forward edge and the opening 4 represented in Fig. 4, or it may cover the entire inner surface of the ear as in Fig. 5, in the latter case the opening 4 will extend through the attachment piece 9. The front portions of these attached pieces will be bent at right angles to the ears either before or after being secured in place. These attaching pieces will have a notch 10 cut into them just above the edge of the vessel to receive the cover or lid.

Having thus described the invention, what is claimed is:—

A cooking vessel having a laterally extending rim and provided with oppositely disposed bail supporting ears extending vertically above the rim, said bail supporting ears being each formed of a single piece of metal having an intermediate portion thereof provided with a transverse reinforcing rib opening inwardly for the reception of the rim and one vertical edge provided with a notch intersecting the rib, the metal between the notch and the free end of the ear being bent inwardly to form a vertical stop flange disposed at right angles to said rim and having its upper end provided with a square portion arranged flush with the top of the adjacent ear.

In testimony that I claim the foregoing as my own, I have hereto affixed my signature in the presence of two witnesses.

FREDERICK NEWELL MARTINDALE.

Witnesses:
 FRANK L. COX,
 CHARLES S. BODMAN, Jr.